United States Patent [19]

MacPherson et al.

[11] Patent Number: 5,812,345

[45] Date of Patent: Sep. 22, 1998

[54] MONOSTABLE ACTIVE LATCH FOR A DISK DRIVE ACTUATOR

[75] Inventors: Aaron S. MacPherson, Ft. Collins; Gordon A. Harwood, Longmont; James W. Boeckner, Jr., Broomfield; Jonathan D. Jargon, Boulder, all of Colo.

[73] Assignee: Maxtor Corporation, Longmont, Colo.

[21] Appl. No.: 474,939

[22] Filed: Jun. 7, 1995

[51] Int. Cl.⁶ ............................................. G11B 5/54
[52] U.S. Cl. ................................................. 360/105
[58] Field of Search .................................... 360/104–106

[56] References Cited

U.S. PATENT DOCUMENTS

| | | | |
|---|---|---|---|
| 4,647,997 | 3/1987 | Westwood | 360/105 |
| 4,805,055 | 2/1989 | Wright | 360/106 |
| 4,851,943 | 7/1989 | Perry | 360/105 |
| 4,965,684 | 10/1990 | Stefansky | 360/78.12 |
| 4,985,793 | 1/1991 | Anderson | 360/105 |
| 4,989,108 | 1/1991 | Chang | 360/105 |
| 5,012,371 | 4/1991 | Pollard et al. | 360/105 |
| 5,023,736 | 6/1991 | Kelsic et al. | 360/105 |
| 5,034,837 | 7/1991 | Schmitz | 360/105 |
| 5,043,834 | 8/1991 | Kubo et al. | 360/105 |
| 5,117,318 | 5/1992 | Immler et al. | 360/105 |
| 5,162,959 | 11/1992 | Arin et al. | 360/105 |
| 5,189,576 | 2/1993 | Morehouse et al. | 360/105 |
| 5,208,713 | 5/1993 | Lindsay et al. | 360/105 |
| 5,227,936 | 7/1993 | Strickler et al. | 360/97.02 |
| 5,231,556 | 7/1993 | Blanks | 360/105 |
| 5,363,261 | 11/1994 | Eckberg et al. | 360/105 |
| 5,365,389 | 11/1994 | Jabbari et al. | 360/105 |
| 5,377,065 | 12/1994 | Morehouse et al. | 360/105 |
| 5,379,171 | 1/1995 | Morehouse et al. | 360/105 |
| 5,381,290 | 1/1995 | Cheng | 360/105 |
| 5,394,281 | 2/1995 | Kajitani | 360/105 |
| 5,448,436 | 9/1995 | Albrecht | 360/105 |
| 5,452,161 | 9/1995 | Williams | 360/105 |
| 5,495,376 | 2/1996 | Wasson et al. | 360/105 |

*Primary Examiner*—Stuart S. Levy
*Assistant Examiner*—David D. Davis
*Attorney, Agent, or Firm*—Sheridan Ross P.C.

[57] ABSTRACT

A monostable active latch apparatus is disclosed for use in a hard disk drive which has a housing, a rotating data storage disk and an actuator mounted in the housing. The actuator controllably positions a read/write head over a predetermined portion of the disk and includes a voice coil motor coil carried by a yoke portion of the actuator. The active latch uses a permanent magnet to bias an elongated rotatable latch arm into engagement with the actuator when the actuator is positioned in the landing zone. An electromagnet coil, positioned between the magnet and the magnetic return plates, when energized, counters this bias, permitting the latch arm to rotate, counterclockwise, out of engagement with the actuator.

When the coil is deenergized, the permanent magnet provides a clockwise torque on the arm, raising the latch end of the latch arm to a first position out of the path of the actuator. When the coil is energized, the latch end of the latch arm is driven to a second position beneath the rear end of the actuator. If the coil is deenergized while the actuator is positioned in the landing zone of the disk, the latch end of the latch arm catches and latches the actuator, preventing further rotation of the actuator until the coil is again energized and the actuator moved away from the landing zone.

21 Claims, 4 Drawing Sheets

MONOSTABLE ACTIVE LATCH FOR A DISK DRIVE ACTUATOR

BACKGROUND OF THE INVENTION

1. Field of the Invention

This invention generally relates to data storage disk drive devices and more particularly to an actuator latching apparatus for a miniature hard disk drive device designed to maintain the actuator in a fixed position during periods of nonuse.

2. Description of the Related Art

Hard disk drive units for use in laptops and other small portable computers are progressively being designed to be smaller and more compact. The purpose for this effort at size shrinkage is to provide the user with more convenience, greater portability, and minimal weight, without sacrificing storage capacity. A major consideration in the design of such small, portable hard disk drives is the effects of mechanical shock loads to the drive during handling.

Any time the rotating magnetic data storage disk of a disk drive is brought to a stopped condition, there is no aerodynamic cushion available to float the magnetic read/write head above the disk surface. Consequently, to prevent damage to the head and/or to the disk surface, the head is usually either "parked" in a landing zone area on the disk so that contact between the head and the disk surface is restricted to a particular unusable area, or the head is parked on a ramp which raises the head off of the disk surface. In addition, the drive must be designed so that the actuator is prevented from moving away from the landing zone onto the data region of the disk as a result of shock loads.

A latching mechanism or locking device is typically utilized to prevent undesired movement of the actuator and thus protect the disk from the effects of mechanical shock to the drive. These mechanisms may be active, in that mechanical motion is required to either latch or unlatch the actuator; or passive, in that no mechanical motion is required to latch or unlatch the actuator.

For example, U.S. Pat. No. 5,363,261 discloses a bistable active magnetic latch which has opposing fixed arms which rotate about a pivot post having an axis parallel to the actuator axis. In this design, as the actuator rotates into the landing zone on drive shutdown, a projection on the actuator physically pushes against a shoulder on the latch arms to rotate the opposing arms clockwise to a position where a magnet attracts and holds one of the arms against a stop. When power is applied to the actuator coil on drive startup, sufficient torque is applied against the projection by the actuator motor to overcome the attraction between the magnet and the stop and cause the latch arms to rotate counterclockwise to a stable, unlatched position, releasing the actuator. This design is thus a bistable active latch mechanism.

U.S. Pat. No. 5,381,290 discloses another bistable active mechanical latch mechanism in which the actuator yoke leg has a pair of projections which cooperate to rotate a latch arm between latched and unlatched positions. When power is cut to the actuator, counter EMF is applied to the voice coil motor of the actuator to move it to the landing zone. As the landing zone is approached, the projections on the actuator yoke leg engage a rotating latch arm which rotates to a latched position in which the permanent magnet holds the latch arm in position to restrain the actuator. When the power is applied to the disk drive, a latch coil is energized momentarily to attract the latch arm to a second position where the permanent magnet and another magnetic mass keeps the latch in the unlatched position, thus releasing the actuator.

U.S. Pat. No. 5,365,389 discloses a passive cantilevered crash stop and magnetic latch combination. Here, the latch is passive, being magnetic between the yoke of the actuator and a magnet mounted in a cantilevered beam of a crash stop.

U.S. Pat. No. 5,394,281 discloses a head unloading ramp assembly that maintains the actuator and head raised from the surface of the disk when the drive is deenergized.

U.S. Pat. No. 5,377,065 and 5,379,171 disclose examples of spring biased inertial active latching mechanisms that use a rotary latch member or disk adjacent the actuator. This mechanism is an example of a latch which only operates when a force is exerted on the disk drive housing in a direction which imparts a rotational force to the actuator away from the landing zone.

Other disk drive latch mechanisms are disclosed in U.S. Pat. Nos. 5,231,556; 5,227,936; 4,989,108; 5,012,371; 5,023,736; 5,034,837; 5,043,834; 5,162,959; 5,208,713; 4,851,943; 4,965,684; 5,189,576; 4,647,997; 4,805,055; and 4,985,793.

Small, portable disk drive units are designed to be primarily powered by batteries. Thus power management considerations are important and require that the disk drives be operable with a minimum amount of power. Furthermore, most such applications require extremely low standby power requirements for the disk drives when they are not being written to or read from. These power management requirements usually restrict latching designs to primarily static or passive embodiments which do not continuously consume power.

As drive sizes continue to shrink and the amount of physical data area available on the disk decreases, It is desirable to maximize the free movement of the actuator to maximize the data area without having to sacrifice movement, and hence useable disk data area to accommodate the latching mechanism. Finally, as such drives become smaller and more portable, i.e., on the order of a credit card size, the frequency of occurrence, amount and direction of potential shock loading during handing becomes less predictable for the designer and the electrical requirements for active mechanisms become even more restrictive.

These shock loads can also occur while the hard disk drive unit is energized, especially in the case of hand held computers. Consequently, there is a need for an active latch design that will prevent actuator movement during shock loading even while the drive is powered but not performing a read/write operation and which is compact and consumes minimal electrical power during operation.

SUMMARY OF THE INVENTION

It is an object of the invention to provide an active latch mechanism for a hard disk drive which has minimal power consumption during operation.

It is another object of the invention to provide a compact active latch mechanism suitable for use in miniature hard disk drive units.

It is another object of the invention to provide a latch mechanism which can be operated to restrain actuator movement in between read/write operations on an energized hard disk drive.

It is a still further object of the invention to provide a monostable latch mechanism in which the latch arm is resiliently biased toward a standby position when disengaged with the actuator.

It is a still further object of the invention to provide a monostable latch apparatus which restrains the actuator from rotational movement during any potential shock load condition applied in any direction.

The monostable active latch apparatus for a disk drive in accordance with the present invention is a latching mechanism which maintains the disk drive actuator and its head at a fixed angular position on the disk with the read/write slider head in a designated place such as a landing zone, i.e., in a "parked" position, away from the data portion of the disk surface when the disk drive is deenergized and/or when no disk access command is being executed.

The active latch apparatus in accordance with the present invention is designed for use in a hard disk drive having a housing, a rotating data storage disk and an actuator mounted in the housing. The actuator controllably positions a read/write head carried at one end of the actuator over a predetermined portion of the disk. The actuator includes a voice coil motor coil carried by a yoke portion at the other end of the actuator.

The active latch apparatus includes a frame mounted in the hard drive housing adjacent the actuator, a latch arm mounted on the frame for movement between a first standby position, a second release position and a third latched position, biasing means coupled to the arm for biasing the arm toward the first position and a latching member on the yoke portion of the actuator. The latching member is engagable with the latch arm when the actuator is rotated to a predetermined position and the latch arm is in the third, or latched position. Finally, the apparatus includes controllable means for releasably positioning the latch arm in the second or release position.

The latch arm is mounted on the frame in the drive housing for rotation about an axis perpendicular to the axis of rotation of the actuator. The latch arm preferably rotates in a vertical plane on a pin having one end pressed into, molded into, or otherwise attached to the latch arm. The other end of the pin is in turn slip fit into and journaled for rotation in the stationary frame in the drive housing.

The latch arm is an elongated member having a latch portion at one end and a magnet support portion at the other end. A preferably rectangular bipolar magnet and a first flux return plate are secured together and to the magnet support portion of the latch arm. The mass of the latch portion is substantially equal to the total of the magnet portion, the magnet and the first return plate so that the arm is neutrally balanced.

A second flux return plate is fixed to the frame which supports the pin for rotation of the latch arm. This second return plate faces the magnet on the latch arm. The second flux return plate is asymmetrically positioned on the frame adjacent the pivot pin such that it has a greater portion of its mass and face area below a horizontal plane through the center of the pivot pin. With the latch pin inserted into the frame for rotational movement of the latch arm and the arm horizontal, the first return plate will be out of alignment with the second return plate. The magnetic flux from the permanent bipolar magnet tends to pull the return plates into alignment. Consequently, the magnetic flux from the magnet generates a torque on the latch arm, rotating it clockwise, to a position in which the first and second return plates are confrontingly aligned. However, the frame has a stop which extends out over the latch portion of the latch arm and prevents the magnet from rotating the arm to a position in which the return plates are totally aligned. Thus the orientation of the two return plates and the magnet therebetween biases the arm in a clockwise direction with the latch portion of the latch arm restrained against the stop on the frame. This position of the latch arm is called the "Standby" position. This orientation of the second return plate with respect to the axis of latch rotation and the intensity of magnetic flux from the permanent magnet on the magnet portion of the latch arm determines the intensity and direction of magnetic torque on the latch arm.

An electromagnetic coil is mounted on an annular bobbin of nonmagnetic material and positioned in front of the second return plate, i.e., between the magnet on the latch arm and the second return plate. This coil is wound counterclockwise on the bobbin such that electrical current through the coil in a counterclockwise direction produces a magnetic force which drives the magnet in a counterclockwise direction. Thus, when the coil is energized, the latch end of the latch arm drops down and rests on the drive housing. This is the release or "picked" position of the latch arm. When the latch arm is dropped, the actuator is free to rotate away from the landing zone of the disk.

The latch arm magnet, second return plate, and electromagnetic coil comprise the controllable means for releasably positioning the latch arm in the second position. The return plates and the permanent magnet provide the means for biasing the latch arm toward the first, or standby position.

During disk read/write operations, the latch arm is maintained in the "Standby" position by the permanent magnet. The actuator is rotated out of the landing zone and out of engagement with the latch on the latch arm during such operations. The latch arm stays in the standby position via the permanent magnetic torque created by the flux concentration passing through the second return plate.

However, when the actuator is moved to the landing zone, as upon drive shutdown, a current is fed to the coil to counter the magnetic attraction and drop the latch arm to the second or picked position. When the rotating actuator is in the landing zone, current to the coil is terminated, and the magnet again biases the arm clockwise, i.e., raising the latch arm, to the third or "latched" position in which the actuator is restrained by the latch arm from movement from the landing zone.

The latch arm in accordance with a first embodiment of the invention has an "L" shaped shelf at the latch end of the arm which engages with a tab projecting from the yoke of the actuator when the latch arm is raised from the second to the third positions and the actuator is in the landing zone.

A second embodiment of the latch arm in accordance with the invention has an inclined ramp on the outer surface of the "L" shaped shelf facing the actuator. The shelf is positioned on the latch arm so that the tab on the actuator yoke pushes against the ramp and pushes the latch arm down from a lower "standby" or first position than in the first embodiment as the actuator is rotated into the landing zone. This lowered standby position is maintained by a lower stop height against which the latch arm is biased by the permanent magnet. When the actuator is entirely in the landing zone, the latch arm snaps upward, fully engaging the tab on the shelf to latch the actuator.

A third embodiment of the latch apparatus of the invention has a pin on the latch arm which fits into a socket member on the yoke of the actuator to restrain the actuator in the landing zone. In this third embodiment, the actuator must be moved further into the landing zone in order for the pin on the latch arm to be released allowing the latch arm to rise to the standby position as will be subsequently described.

In each of the embodiments, the latch arm is retained in engagement with the actuator by the permanent magnet force acting on the latch arm. When the hard disk drive is energized and a read/write operation is commenced, a current is applied to the coil which opposes the permanent magnet force thus permitting the latch arm to rotate to the release or picked position in which the actuator is free to leave the landing zone. Once the actuator has moved away from the landing zone, the current to the coil is removed and the permanent magnet again rotates the latch arm back to the first or Standby position, out of the way of the actuator. The latch mechanism is therefore a monostable active latch mechanism in which the permanent magnet and asymmetrically positioned return plate design has only one moving part, the latch arm itself. These and other objects, features, and advantages of the invention will become more apparent to the reader from consideration of the following detailed description when taken in consideration with the accompanying drawing figures.

DETAILED DESCRIPTION OF THE INVENTION

First Embodiment

Figure 1:
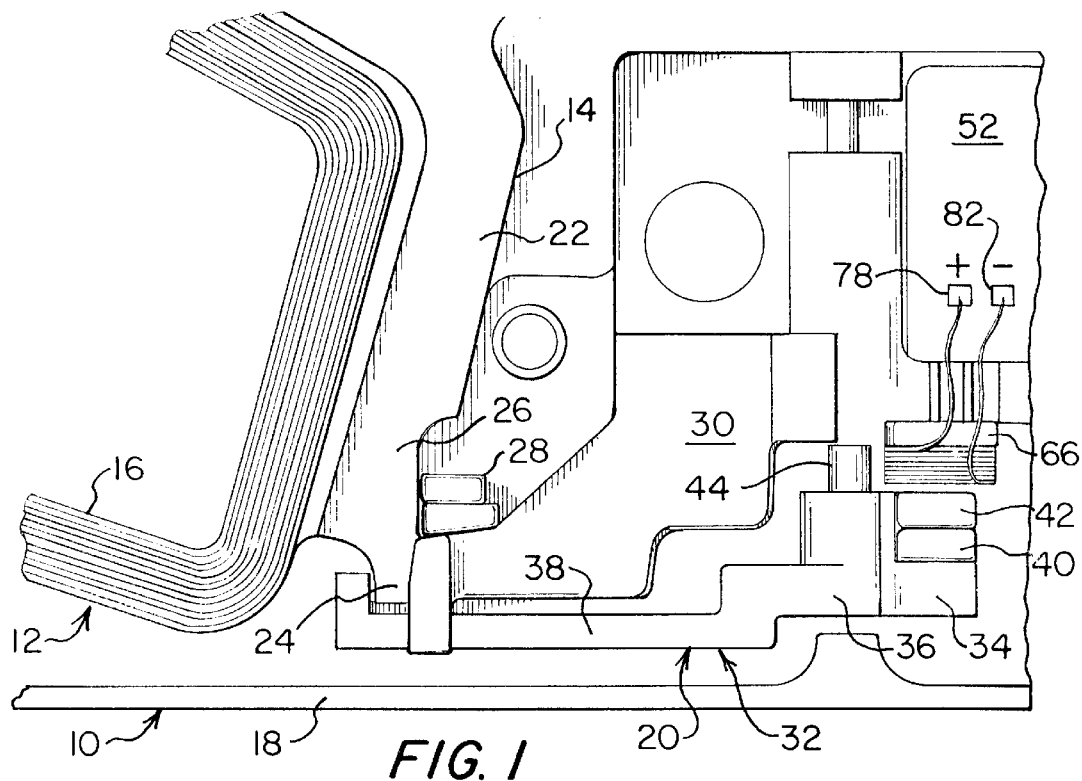
FIG. 1 is a partial plan view of a hard disk drive assembly, with the cover removed, which incorporates the monostable active latch apparatus for the actuator in accordance with a first embodiment of the invention.

Referring now to the drawing, a partial plan view of a hard disk drive assembly 10, with the cover removed, is shown in FIG. 1. The hard disk drive assembly 10 includes at least one rotary hard disk (not shown) typically having magnetic media on both upper and lower surfaces thereof, a disk drive motor (also not shown in FIG. 1), and an actuator 12 rotationally mounted adjacent the hard disk. The actuator 12 is rotated by a voice coil motor. The actuator 12 is an elongated member which includes a head support portion (not shown) at one end which supports read/write heads on the upper and lower surfaces of the disk and a yoke portion 14 at the other end which supports a voice coil 16. The voice coil 16 constitutes the moving portion of the voice coil motor which is used to control the position of the actuator 12.

The disk(s), disk drive motor, actuator 12, voice coil motor, and associated electronic circuitry are mounted in a disk drive housing 18 which provides structural support and a complete containment for all of the moving components. Both the disk and the actuator rotate about separate vertical axes. In FIG. 1, the top portion of the housing 18, stationary upper return plate and voice coil motor magnet have been removed to reveal the monostable active latch apparatus 20 for the actuator 12 in accordance with a first embodiment of the present invention.

The yoke portion 14 of the actuator 12 is a generally "U" shaped metal member which carries the actuator voice coil 16 between a pair of horizontally extending spaced legs 22, one of which is shown in FIG. 1. This leg 22 has a latch tab 24 projecting axially from its distal end. The leg 22 is typically a metal bar member having a generally rectangular cross section. This leg 22 has a flat side portion 26 adjacent the tab 24 which is designed to engage a crash stop 28 that is part of the distal end of the frame 30 mounted in the housing 18. This crash stop 28 is designed to prevent the actuator 12 from rotating too far toward the center of the disk thus preventing the heads from being positioned to the inside of the annular region of the disk called the "landing zone".

Figure 2:
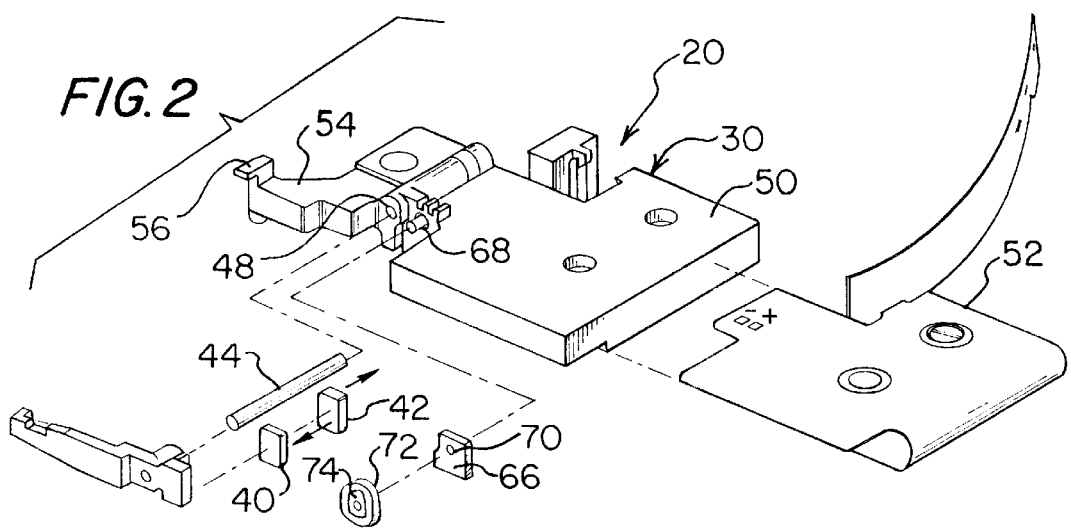
FIG. 2 is an exploded perspective view of the monostable active latch apparatus in accordance with the first embodiment of the present invention.

The latch apparatus 20 according to the invention, shown in an exploded view in FIG. 2, comprises a frame 30 mounted in the hard drive housing 18 adjacent the actuator 12 and a latch arm 32 mounted on the frame 30 for movement between a first standby position, a second release position and a third latched position. This latch arm 32 is an elongated, preferably plastic member having a magnet support portion 34 at one end, a central portion 36, and an elongated latch portion 38 at the other end. The magnet support portion 34 is short in comparison to the latch portion 38 and has a generally rectangular face. A small, generally rectangular, magnetically conductive first return plate 40 is fixed to the face of the magnet support portion 34. A bipolar magnet 42 is in turn fixed to the rectangular first return plate 40. The bipolar magnet 42 and the return plate 40 preferably have similar shapes and are adhesively bonded together and to the magnet support portion 34 of the latch arm 32 with a suitable adhesive.

The bipolar magnet 42 is a rectangular solid body of magnetic material such as a neodymium-iron-boron alloy having a minimum residual flux density of, for example, about 11,800 Gauss. The magnet 42, dimensioned for use in a 1.8 inch form factor drive, is approximately 3.4 mm long, 2.2 mm wide, and 1.25 mm thick. The magnet 42 is oriented on the magnet support portion 34 with its longer dimension upright, at right angles to the longitudinal axis of the latch arm 32. The magnet 42 has a magnetic orientation as shown by the arrows in FIG. 2. The bipolar magnet 42 has an upper face portion and a symmetrical lower face portion facing the frame 30 and is magnetically oriented such that magnetic flux lines emanate from the upper face portion horizontally outward toward the frame 30 and return horizontally into the lower face portion of the magnet 42 facing the frame 30. Similarly, magnetic flux emanates from the lower face portion horizontally in the opposite direction toward the first return plate 40 and the magnet support portion 34 and returns horizontally into the upper face portion of the magnet 42 from the first return plate 40. Stated another way, the magnetic orientation is defined as that in which the south pole of a compass points to the side indicated by the arrows in FIG. 2.

The central portion 36 of the latch arm 32 has a through bore 46. One end of a pivot pin 44 is press fit, molded, or otherwise secured into the through bore 46. The other end of the pivot pin 44 is received in and journaled for free rotation in a horizontal bore 48 in the frame 30. The latch arm 32 is therefore free to rotate in a vertical plane perpendicular to the longitudinal axis of the pivot pin 44, adjacent the frame 30. The latch arm 32 thus rotates in a plane perpendicular to the planes of rotation of the disk and the actuator 12.

The frame 30 is a preferably plastic member with a generally flat block portion 50 which has the horizontal bore 48 through one end thereof and which is rigidly mounted via screws to the disk drive housing 18. A flexible printed circuit (FPC) 52 carrying at least the read/write portion of the disk drive control circuitry is wrapped around the upper and lower faces of the block portion 50. Thus besides supporting the latch arm 32, the block portion 50 of the frame 30 also supports and secures the FPC 52 to the housing 18.

An elongated finger portion 54 extends horizontally from the block portion 50 of the frame 30 along side the latch portion 38 of the latch arm 32. This finger portion 54 is stationary and ends in a raised, horizontally projecting stop tab 56 which extends outward over and above the latch arm 32. This stop tab 56 engages and prevents the latch arm 32 from being rotated clockwise beyond the stop tab 56. The latch portion 38 of the latch arm 32 has a notch 58 in its upper side which receives and engages with the stop tab 56. The stop tab 56 also prevents the latch arm 32 from hitting the upper cover portion (not shown) of the housing 18.

The latch portion 38 of the latch arm 32 has a generally rectangular cross section with narrow upper and lower sides. The latch portion 38 of the latch arm 32 has sufficient length and mass so as to be substantially equal to and thus neutrally balanced by the combined mass of the magnet support portion 34, the first return plate 40, and the magnet 42. The latch portion 38 has an "L" shaped shelf 60 molded onto the side of the latch portion 38 facing the frame 30 at its distal end. This shelf 60 has a short leg 62 oriented vertically along the distal end of the latch portion 38 and a long leg 64 extending horizontally from the distal end toward the central portion 36. This "L" shaped shelf is dimensioned and positioned to receive and capture the end of the latch tab 24 on the yoke leg 22 of the actuator 12 as is shown in FIG. 1 when the latch arm 32 is in a latched position. The tab 24 rests on the long leg 64 of the shelf 60. The tab 24, and therefore the actuator 12, is prevented from moving away from the latch arm 32 by interference with the vertical leg 62 on the distal end of the latch arm 32.

Since the latch portion 38 has a mass and weight substantially equal to the assembled magnet support portion and is thus neutrally balanced for shock tolerance, a biasing means is partly incorporated into the latch arm to rotate the latch portion 38 upward in a clockwise direction to keep the actuator 12 latched. This biasing means, which includes the magnet 42 and the first return plate 40 mounted on the latch arm, utilizes a second return plate 66 mounted in a fixed position on the block portion 50 of the frame 30. This fixed position is adjacent to and centered below the horizontal centerline of the pivot bore 48, and faces the magnet 42. More specifically, the block portion 50 has a horizontally projecting support pin 68 spaced horizontally from and extending parallel to the bore 48 toward the magnet support portion 34 of the latch arm 32. The second return plate 66 is a flat plate having an aperture 70 through an upper half portion thereof. The second return plate 66 is slipped over the support pin 68 on the block portion 50 via aperture 70 and adhesively fixed in place against the side of the block portion 50. Because the aperture 70 is through the upper half of the plate 66 most of the mass of the return plate 66 resides below the horizontal centerline of the pivot pin 44. Looked at another way, there is less of the second return plate 66 above the support pin 68 and therefore there is little mass and surface area of the return plate 66 above the support pin 68 directly across from the magnet 42. The magnetic flux emanating from the upper portion of the magnet 42 toward the second return plate 66 has to bend downward to pass into the plate 66 and then exit substantially perpendicularly out of the face of the plate 66 to get back to the magnet 42. This creates a clockwise torque on the latch arm 32, rotating the latch arm 32 clockwise until the latch portion of the latch arm either engages the stop 56 and is thus at a first or "standby" position, or engages the tab 24 on the actuator yoke leg 22 at a third, or "latched" position, provided the actuator 12 has been moved into the landing zone of the disk as will be more fully described below.

Finally, a controllable means is provided for releasably rotating the latch arm 32 counterclockwise to a second or "picked" position in which the latch arm 32 rests against the base portion of the housing 18. This controllable means includes a latch coil 72, preferably made of copper wire, wound on an annular plastic bobbin 74, which is in turn fixedly mounted on the support pin 68 in front of the second return plate 66. This latch coil 72 is thus positioned between the magnet 42 and the second return plate 66.

The coil of wire 72 is wound counterclockwise on the bobbin 74 and is positioned against the second return plate 66 so that electrical current flowing through the coil 72 in a counterclockwise direction generates magnetic force in opposition to the magnetic attraction produced by the permanent magnet 42. In effect, then, the magnetic force generated by current flowing through the coil 72 counteracts the clockwise torque on the latch arm 32 from the bipolar magnet 42 interacting with the second return plate 66 as previously described. This current permits the latch portion 38 to rotate the latch arm 32 downward in a counterclockwise direction to the second, or picked, position against the base portion of the housing 18.

The positive lead of the coil 72 passes through a first groove 76 in a top portion of the block portion 50 and is terminated at a (+) solder pad 78 on the FPC 52. The negative lead of the coil 72 passes through a second groove 80 in the top of the block portion 50 and is terminated at a (−) solder pad 82 on the FPC 52. A 5 volt D.C. potential is preferably applied to the coil 72 via pads 78 and 82 in order to generate the required opposition force.

Figure 6:
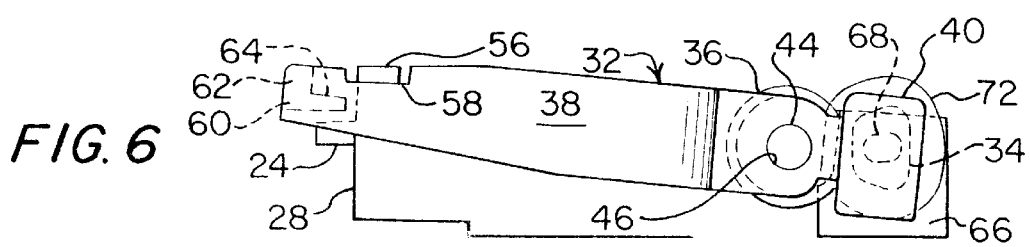
FIG. 6 is a side view of the assembled active latch apparatus of the invention shown in FIG. 5 with the latch arm in the standby position.
Figure 3:
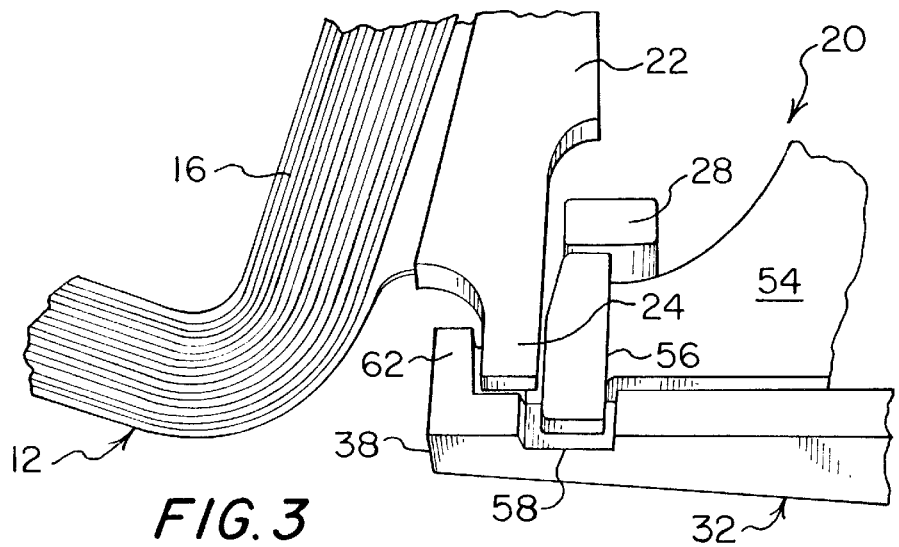
FIG. 3 is a top perspective view of the active latch apparatus of the first embodiment of the invention in the latched position with the latch coil deenergized and the latching tab on the yoke of the actuator engaged with the latch arm.
Figure 4:
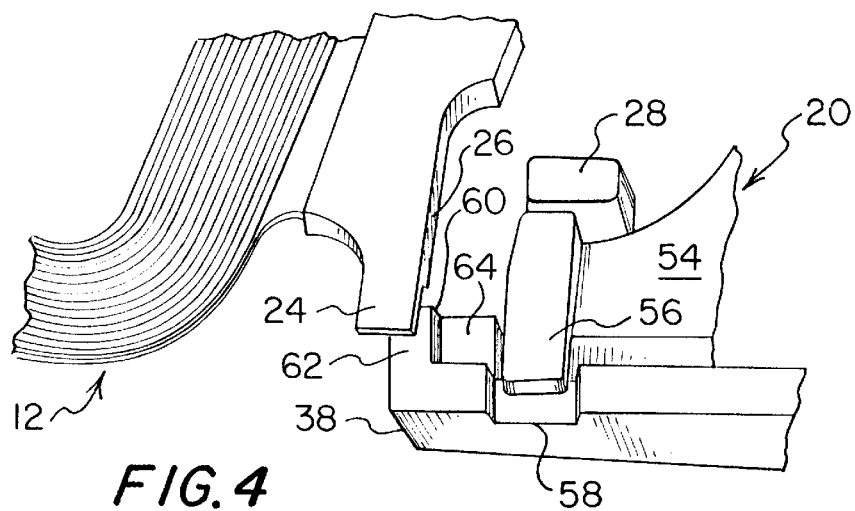
FIG. 4 is a top perspective view of the active latch apparatus shown in FIG. 3 with the latch coil energized, the latch arm lowered to the release or "picked" position so that the latching tab on actuator yoke is disengaged from the latch arm and the actuator is free to rotate away from the latch apparatus.
Figure 5:
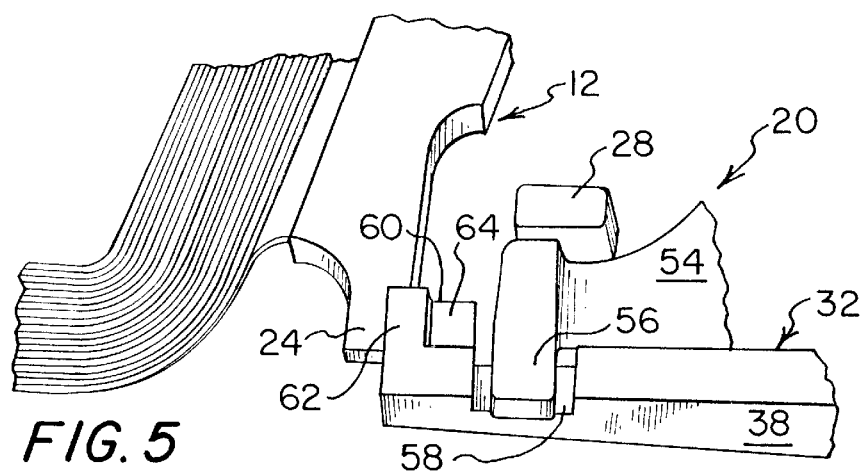
FIG. 5 is a top perspective view of the active latch apparatus shown in FIG. 3 with the latch coil deenergized and in the latch arm raised to the "standby" position so that the latching tab on the actuator yoke can freely pass beneath the latch arm.

Referring now to FIGS. 3, 4, 5 and 6, operation of the latch apparatus of the first embodiment of the invention will be explained. The latch arm 32 has three distinct positions. In a first position, as is shown in FIGS. 5 and 6, called the Standby position, the actuator 12 is disengaged from the latch arm 32. The actuator 12 is free to rotate in a horizontal plane away from and toward the latch arm 32. This is the position of the latch arm 32 during execution of read/write commands, i.e., disk access operations, and for a predetermined period of time thereafter, typically on the order of 300 milliseconds.

Whenever a disk access command has not been received for this predetermined period of time, a "park" command is sent to the actuator controller and the latch coil 72 is energized, dropping the latch arm 32 to the second position, called the release or "picked" position, as is shown in FIG. 4. The tab 24 on the leg 22 passes over the top of the shelf 60 on the latch arm 32 as the actuator 12 fully enters the landing zone. The voltage applied to the coil 72 is only applied for the actual time necessary for the actuator 12 to rotate fully into the landing zone, at which time the coil 72 is deenergized. When the coil 72 is deenergized, the permanent magnet 42 interacts with the second return plate 66 to again bias the latch arm 32 in a clockwise direction toward the standby position shown in FIGS. 5 and 6. However, this time the latch tab 24 engages the horizontal leg 64 of the shelf 60. The tab 24 is prevented from rotating outward, away from the latch arm 32, by interference with the vertical leg 62 of the shelf 60. In addition, the tab 24 is restrained from inward movement by the flat side portion 26 engaging the crash stop 28. Thus the actuator 12 is securely latched with the read/write heads in the landing zone. The latch arm 32 is resiliently biased in this third, or latched position by the magnet 42. This third or latched position is illustrated in FIG. 3.

When a disk access command is sensed by the latch control circuitry, the coil 72 is momentarily energized, dropping the latch arm 32 to the second, or picked position, releasing the actuator 12. Simultaneously, current is fed to the voice coil motor to move the actuator 12 away from the landing zone. The coil 72 then deenergizes, permitting the permanent magnet 42 to again rotate clockwise to the position shown in FIGS. 5 and 6, with the latch arm 32 to the standby position during the read/write operation. At the conclusion of the predetermined period following such an operation, the actuator 12 is again latched as above described. In this way, the time that the actuator 12 spends away from the latched position is minimized, thus minimizing the chance for any handling shock loads to affect operation of the drive unit.

The latch control circuitry is of conventional design, well within the purview of the skilled artisan, and therefore will not be described in detail here. The circuitry simply permits a latch enable signal, connected to a solid state switch of conventional design, to in turn apply typically a 5 volt D.C. potential to the coil 72 during initiation of a disk access command, and also following the inactive period as above described.

The latch apparatus 20 in accordance with the first embodiment of the invention permits the latch tab 24 on the actuator 12 to pass beneath the shelf 60 on the latch arm 32 during normal disk access command operations. This prevents interference with the latch arm 32 when accessing the innermost data tracks on the drive and thus permits design of a narrower landing zone than would otherwise be required. In addition, this feature maximizes the available disk surface area for data storage.

Second Embodiment

Figure 7:
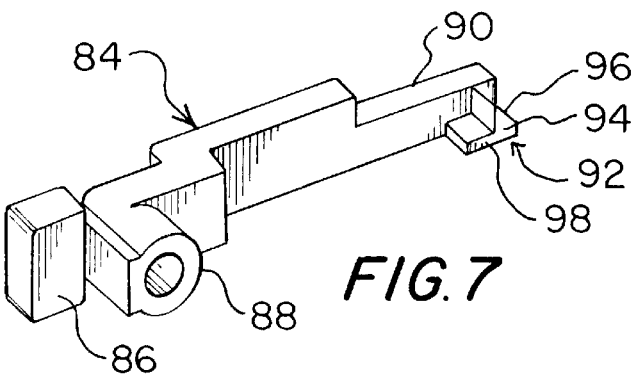
FIG. 7 is a perspective view of a second embodiment of the latch arm accordance with the invention.

A second embodiment of the invention is physically identical to the first embodiment above described except for having a modified latch arm 84 as shown in FIG. 7. The modified latch arm 84 has a magnet support portion 86, a central portion 88, and an elongated latch portion 90. The magnet support portion 86 and the central portion 88 are identical to the portions 34 and 36 of the first embodiment above described. However, in this design, the latch coil 72 need not be energized to drop the latch arm in order to latch the actuator 12.

The latch portion 90 has a modified L shaped shelf 92 which has a vertical leg 94 and a horizontal leg 98. The vertical leg 94 of the modified shelf 92 has an inclined ramp 96 on its outer face. Due to a lowered position of the stop 56 in this second embodiment, the latch portion 90 and the ramp 96 cooperate to interfere with passage of the tab 24 on the yoke leg 22 as the actuator 12 moves toward the landing zone. The stop tab 56 is positioned such that the latch arm 84 is in the latched position during normal read/write operations. As the landing zone is approached, the tab 24 pushes against the ramp 96, pushing the latch portion 92 down until the tab 24 is fully on the horizontal leg 98 of the shelf 92. The tab 24 on the yoke leg 22 may be configured with a matching ramp surface that is parallel to the latch arm ramp 96 in order to minimize the frictional loading on the actuator 84 and the latch portion 92 as the latch portion 92 is pushed down.

Operation of this second embodiment of the invention is similar to that of the first embodiment 20 described above except that the latch coil 72 does not need to be energized to lower the latch arm 84 in order to latch the tab 24 on the actuator yoke leg 22. Thus a latch enable signal is not needed when the actuator 12 approaches the landing zone. In addition, the use of the area of the disk immediately adjacent the landing zone for data storage is compromised. The actuator 12 must push the latch arm 84 down as the landing zone is approached. This means that the tracks immediately adjacent the landing zone cannot be accurately tracked for read and write operations while at the same time the actuator 12 is exerting the required force against the latch arm 84. Accordingly, data cannot reliably be written to or read from these tracks. This reduces the overall effective storage area of the disk, but because the coil current is not required for latching, the overall power consumption is correspondingly reduced and a conventional power down actuator retract circuit will function to latch the actuator.

Release of the actuator 12 in this second embodiment is identical to that of the first embodiment, in which the latch coil 72 is energized to rotate the latch arm 84 counterclockwise to the second, or picked position, permitting the actuator 12 to rotate away from the landing zone. Following release of the actuator 12, the coil 72 is again deenergized, and the latch arm 84 rotates clockwise to the standby position against the stop 56 which has been modified to position the latch arm 84 in the lowered standby position.

Third Embodiment

A third embodiment 100 of the latch apparatus in accordance with the invention is shown in FIGS. 8 through 11. In this embodiment, the captured member resides on the latch arm and the capturing structure resides on the leg of the actuator 101. Otherwise, the latch apparatus 100 is physically the same as above described with reference to the first embodiment 20.

Figure 8:
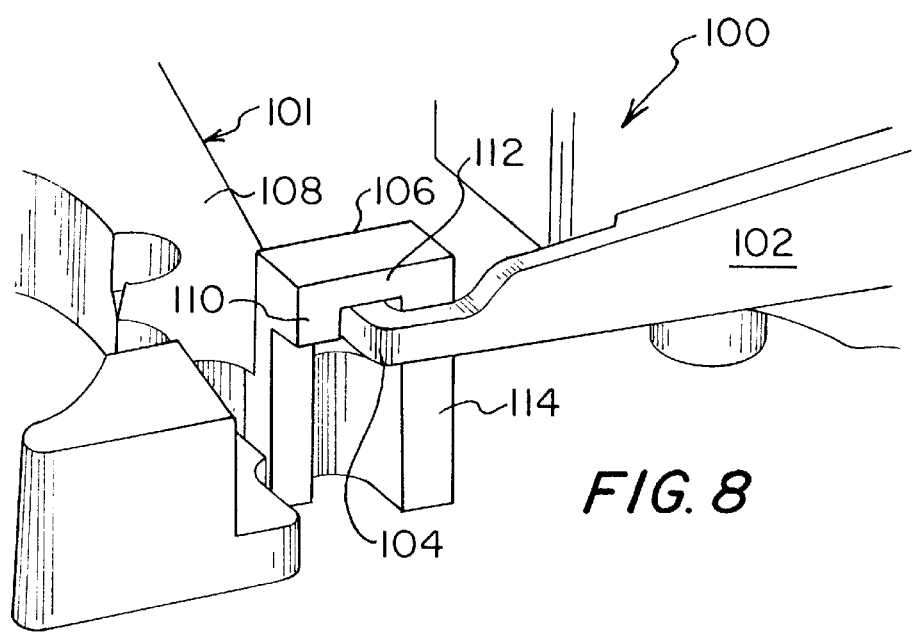
FIG. 8 is a partial perspective view of a third embodiment of the active latch apparatus in accordance with the invention, with the latch in the latched position.

Referring to FIG. 8, the latch apparatus 100 comprises an elongated sheet metal latch arm 102 which has its distal end bent at right angles to the latch arm to form a latch pin 104. This pin 104 is the captured structure which is captured in a box shaped socket structure 106 formed at the distal end of the actuator yoke leg 108. This box shaped socket structure 106 has an open bottom, a partially recessed left side wall 110, a solid closed top wall 112, and a solid right side wall 114 forming an inverted "J" vertical end surface shape facing toward the latch pin 104.

The remainder of the latch apparatus 100, including the central portion and magnet support portions of the latch arm, the latch coil, and the frame are basically the same as in the first embodiment described above and shown in FIGS. 1 through 6. Thus the operation of the latch arm via a bipolar permanent magnet cooperating with first and second return plates to provide a clockwise torque on the latch arm 102 and momentary energization of a latch coil to counter the permanent magnet attraction to the second return plate and rotate the latch arm 102 counterclockwise is the same as in the first embodiment. Accordingly, discussion and illustration of those structures and components will not be duplicated again here. Only those structures which differ from the first embodiment are shown in FIGS. 8 through 11 and will be described below.

FIG. 8 shows the latch pin 104 engaged with the box structure 106 in the third or latched position. The permanent magnet torque on the latch arm 102 rotates the latch arm clockwise so that the latch pin 104 is against the top wall 112, i.e., engaged in the "crook" of the inverted J face of the box structure 106. In this latched position, the yoke leg 108 of the actuator 101 is prevented from either moving toward the crash stop 116, via the short solid portion of the left side 110, or moving away from the landing zone by the right side wall 114 of the box structure 106.

Figure 9:
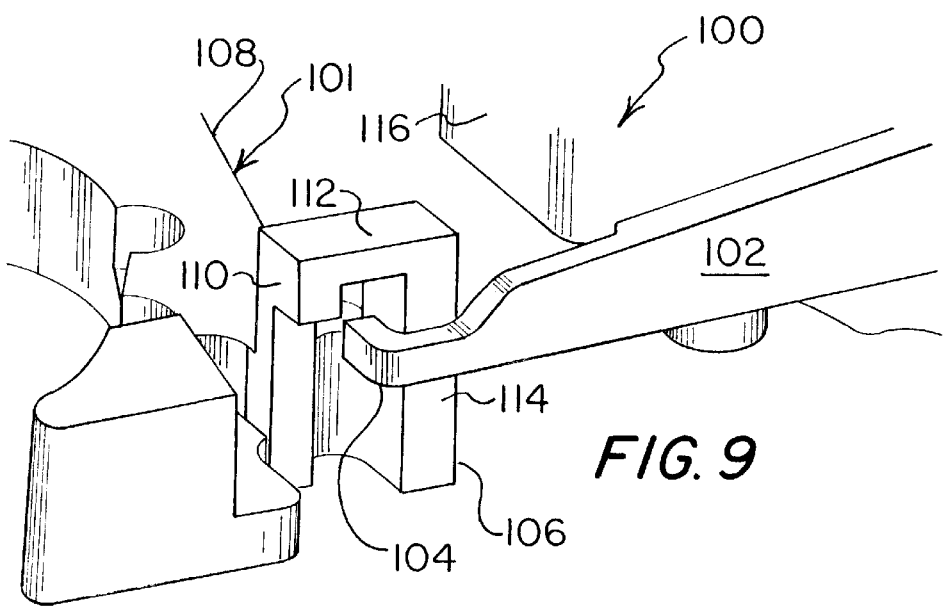
FIG. 9 is a partial perspective view of the third embodiment of the invention with the latch coil energized and the latch arm lowered to the "picked" position.
Figure 10:
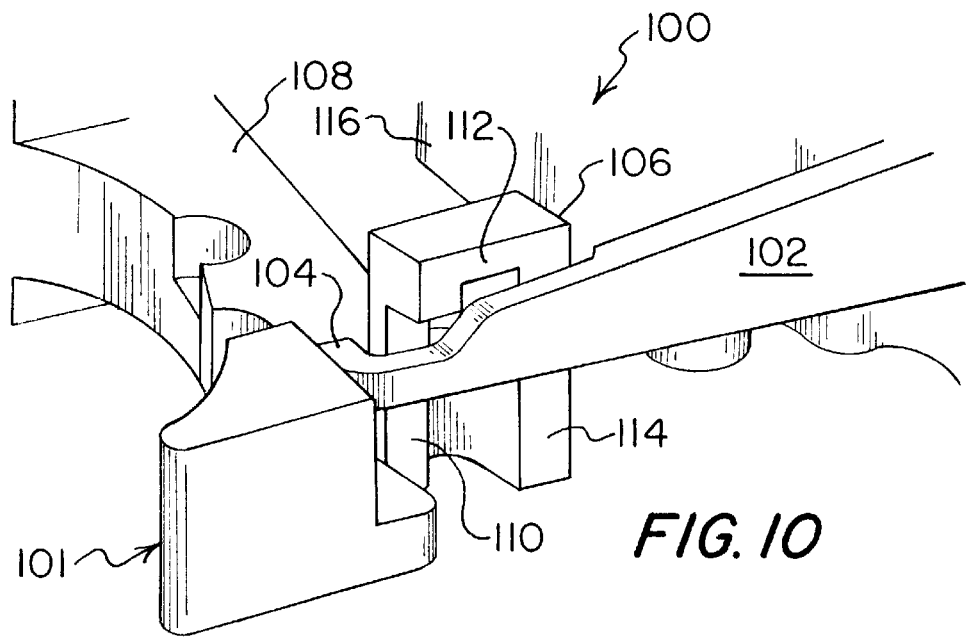
FIG. 10 is a partial perspective view of the third embodiment of the invention with the actuator rotated to the in the unlatched/release position while the latch coil is energized.
Figure 11:
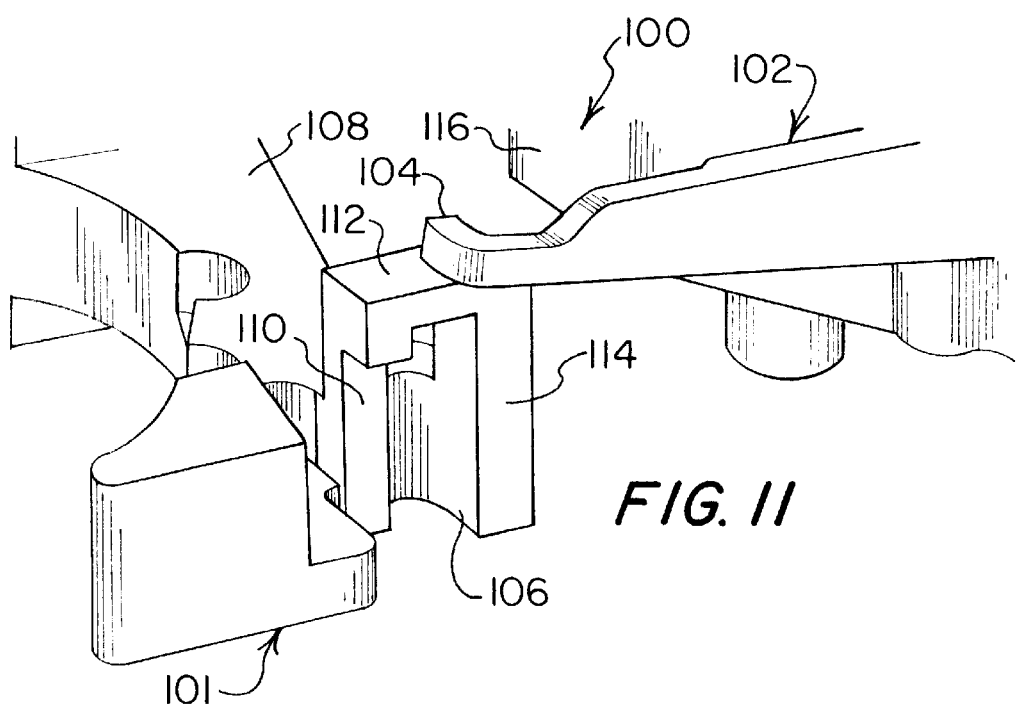
FIG. 11 is a partial perspective view of the third embodiment of the invention with the latch coil deenergized and the latch arm in the standby position, permitting the actuator to rotate freely away from and then back under the latch arm.

However, in this third embodiment, an extra motion by the actuator 101 is required, compared to the first embodiment, in order for the actuator 101 to be released from the latch apparatus 100. First, the latch control circuit receives a latch enable signal and actuates the solid state switch to energize the latch coil which causes the latch arm 102 to rotate counterclockwise to the second, or picked position, as shown in FIG. 9. Second, the voice coil motor on the actuator 101 moves the actuator 101 toward the crash stop 116 so that the left wall 110 clears the latch pin 104 to the position shown in FIG. 10. Third, the latch coil is deenergized, permitting the bipolar permanent magnet to rotate the latch arm 102 clockwise, raising the latch pin 104 to the first, or standby position in which the latch pin 104 is positioned above the box structure 106 as shown in FIG. 11. This permits the actuator 101 to move freely beneath the latch pin 104 as in the first embodiment. This feature permits the tracks adjacent the landing zone to be used for data storage as in the first embodiment. Finally, the actuator 101 is moved away from the landing zone to the required track location for the read or write operation.

The main advantage of this third embodiment is that the latch arm may be simply stamped from sheet metal rather than being made as an intricate molded plastic part, thus permitting the assembly to be made more compact. The disadvantage is that the actuator 101 must be moved toward the crash stop while the latch coil is energized in order to permit the latch pin 104 to move to the standby position.

Although the invention has been described with reference to particular embodiments thereof, it is to be understood that many variations, alternatives, and modifications may be made without departing from the scope of the invention. For example, the third embodiment 100 noted above may be modified to eliminate the extra motion of the actuator 101 by changing the shape of the right side wall 114 to match the shape of the left side wall 110. In other words, the right side wall 114 would be provided with a recessed portion adjacent the latch pin 104 when the latch arm 102 is in the picked, second position shown in FIG. 9. This recessed portion would permit passage of the actuator 101 away from the landing zone when the latch arm 104 is in the picked position without having to rotate toward the crash stop 116 and having to wait for the latch coil to be deenergized.

The latch arm 32, return plates 40 and 66, the magnet 42 and the latch coil 72 may be shaped, arranged or constructed otherwise than as specifically shown and described. For example, the magnet 42 and first return plate 40 could be mounted on the frame 30 and the second return plate 66 and coil 72 mounted on the latch arm 32. A portion of the latch arm 32, if made of magnetically permeable material such as steel, could also act as one of the return plates. The right side wall 114 in the third embodiment could also include a ramp surface to push the latch arm 102 down as the actuator 101 approaches the landing zone in a similar manner to the second embodiment above described. Also, the latch assembly in accordance with the invention may be readily adapted and used on the data storage devices requiring capture of an actuator to prevent unwanted movement such as optical disk drives. Accordingly, it is intended that all such modifications, variants, and alternatives be included within the scope of the invention as the embodiments specifically described above are merely representative examples of particular embodiments of the invention. All patents, patent applications, and printed publications referred to herein are hereby incorporated by reference herein in their entirety.

What is claimed is:

1. An active latch apparatus for use in a data storage disk drive having a housing, a rotating data storage disk and an actuator mounted for rotation in a given plane in said housing for controllably positioning a read/write head over a predetermined portion of said disk, said predetermined portion comprising a read/write section and a non-read/write section, said apparatus comprising:

a frame mounted in said housing adjacent to said actuator;

a latch arm having a latch thereon, said latch arm being mounted on said frame for movement of said latch among a first latch position, a second latch position and a third latch position, the first latch position being located on one side of said plane, the second latch position being located on a side of said plane opposite to the one side, and the third latch position being located in said plane between the first and second latch positions to intersect said actuator;

means coupled to said latch arm for biasing said latch arm toward said first latch position and said third latch position;

a latching member on said actuator for latching engagement with said latch when said actuator is rotated to the non-read/write section and said latch arm is moved from said second latch position to said third latch position; and means operative for moving said latch arm to move said latch from said third latch position to said second latch position to disengage the latching engagement and allow said actuator to rotate to the read/write section, said moving means moving said latch from said first latch position through said third latch position to said second latch position;

upon completion of the operation of said moving means said biasing means being effective to rotate said latch arm to move said latch to said third latch position and cause the latching engagement of said latch and said actuator at the non-read/write section;

upon completion of the operation of said moving means said biasing means being effective, if said actuator is not in the non-read/write section, to cause said latch to move to said first latch position.

2. The apparatus according to claim 1, further comprising:

said latch arm being mounted on said frame for rotation on a latch arm axis; and said biasing means includes a first flux return plate mounted on said latch arm, a second flux return plate mounted on said frame, and a permanent magnet mounted therebetween so that magnetic flux from said magnet passes through said first and second return plates producing a magnetic force on the latch arm.

3. The apparatus according to claim 2, further comprising:

one of said first and second return plates has a generally rectangular shape and the other of said plates has a shape differing from the shape of said one return plate.

4. The apparatus according to claim 2, further comprising:

said first return plate and said magnet each has a generally rectangular shape.

5. The apparatus according to claim 4, further comprising:

said latch arm having an end portion; and said first return plate and said magnet being mounted to said end portion of said latch arm.

6. The apparatus according to claim 5, further comprising:

said latch arm is an elongated member having said latch opposite to said end portion.

7. The apparatus according to claim 6, further comprising:

a post extending from said frame toward said latch arm and parallel to and spaced from said axis.

8. The apparatus according to claim 7, further comprising:

said second return plate having an upper portion provided with an aperture;

said second return plate being mounted on said post via said aperture such that said latch arm is magnetically biased for clockwise rotation about said latch arm axis when said latch is in any one of said first second, or third latch positions.

9. The apparatus according to claim 8, further comprising:

said means comprises an electrical current conductor positioned about said post which, when electrical current passes through said conductor, produces an electromagnetic force in opposition to said force from said permanent magnet causing said latch arm to rotate counterclockwise about said latch arm axis to position said latch in said second latch position.

10. The apparatus according to claim 2, further comprising:

said second return plate being located on said frame spaced from said latch arm axis such that said latch arm is magnetically biased by said magnet and said return plates for clockwise rotation of said latch arm about said latch arm axis when said latch is in any one of said first second, or third latch positions.

11. The apparatus according to claim 2, further comprising:

said moving means comprises a conductor coil positioned between said return plates and connected to a controllable current source, said coil producing an electromagnetic force in opposition to said force from said permanent magnet during passage of current through said coil.

12. An active latch apparatus for use in a hard disk drive having a housing, a rotating data storage disk and an actuator mounted for rotation on an actuator axis and in an actuator plane in said housing to controllably position a read/write head over a predetermined portion of said disk, said apparatus comprising:

a frame mounted in said housing adjacent to said actuator;

an elongated latch arm mounted for rotation only on a latch arm axis and in a latch plane on said frame for movement between a first position, a second position and a third position, the latch plane being perpendicular to the actuator plane so that said latch arm and said actuator may intersect, said latch arm having first and second ends, said first end having a latch thereon;

magnetic biasing means coupled to said second end of said latch arm for biasing said latch arm to the first position out of the actuator plane;

a latching member on said actuator engagable with said latch on said latch arm when said actuator is rotated to a predetermined position and said latch arm is in the third position, and means for moving said latch arm from the first position and from the third position to the second position to release said engagement of said latching member with said latch and move said latch out of said actuator plane.

13. The apparatus according to claim 12, further comprising:

said biasing means comprising:

a first flux return plate mounted on said latch arm, a second flux return plate mounted on said frame, and a permanent magnet mounted therebetween so that magnetic flux from said magnet passes through said first and second return plates producing a magnetic force on said latch arm.

14. The apparatus according to claim 13, further comprising:

a post extending from said frame toward said latch arm and parallel to and spaced from said latch arm axis, said second return plate having an upper portion provided with an aperture;

said second return plate being mounted on said post via said aperture such that said magnetic force biases said latch arm for clockwise rotation about said latch arm axis when said arm is in any one of said first second, or third positions.

15. The apparatus according to claim 14, further comprising:

said moving means comprises an electrical current conductor coil positioned about said post which, when electrical current passes through said conductor coil in one direction, an electromagnetic force is produced by said coil in opposition to said magnetic force from said permanent magnet, rotating said latch arm counterclockwise about said axis to said second position.

16. The apparatus according to claim 12, further comprising:

said latching member comprises an horizontally extending tab at one end of said actuator, said latch comprising:

an L-shaped shelf and a latch surface, said latch surface extending perpendicular to said actuator plane, said tab and said latch surface engaging when said latch arm is in said third position.

17. The apparatus according to claim 16, further comprising:

said latch further comprising an inclined surface adjacent to said latch surface and facing said tab;

with said latch in the third latch position and in the actuator plane, said tab riding on said inclined surface to rotate said latch on said latch arm axis out of said actuator plane until said tab is over and engages said latch surface when said actuator is moved into said predetermined position.

18. The apparatus according to claim 1, further comprising:

said latching member comprises a socket portion, and said latch comprises a finger member engaging said socket portion when said latch is in the third latch position to prevent rotation of said actuator in said actuator plane.

19. The apparatus according to claim 18, further comprising:

said finger member extends parallel to said given plane; and said socket portion further comprises spaced vertical walls to capture said finger when said latch is in the third position to prevent said actuator from moving from the non-read/write position.

20. The apparatus according to claim 19, further comprising:

one of said socket portion walls being cut away to provide an open side of said socket portion;

said latch being moved by said moving means from the third latch position to the second latch position to move said latch adjacent said open side;

said actuator being movable further over the non-read/write section so that said open side moves past said finger to permit said biasing means to return said latch to the first latch position.

21. An active latch apparatus for use in a data storage disk drive having a housing, a rotating data storage disk and an actuator mounted in said housing for controllably positioning a read/write head over a predetermined portion of said disk, said predetermined portion comprising a read/write section and a non-read/write section, said actuator being mounted for rotation on an actuator axis and in an actuator plane, said apparatus comprising:

a frame mounted in said housing adjacent to said actuator;

a latch arm having a latch thereon, said latch arm being mounted on said frame for movement of said latch among a first latch position, a second latch position and a third latch position, said movement being rotation only on a latch arm axis and in a latch arm plane, the first latch position being located on one side of said actuator plane, the second latch position being located on a side of said actuator plane opposite to the one side, and the third latch position being located between the first and second latch positions and in the actuator plane to intersect said actuator;

a latching member on said actuator engagable with said latch when said actuator is rotated to the non-read/write section and said latch arm in the third position;

means operative for moving said latch from the third latch position to the second latch position to disengage the latching engagement and allow said actuator to rotate to the read/write section, said moving means moving said latch from the first latch position out of the actuator plane through the third latch position to the second latch position out of the actuator plane; and biasing means for rotating said latch arm from the second latch position to the third latch position to cause said latch to latchingly re-engage said actuator in the non-read/write section, said biasing means being effective, if said actuator is not in the non-read/write section, to cause said latch to move to the first latch position out of the actuator plane.

* * * * *

UNITED STATES PATENT AND TRADEMARK OFFICE
CERTIFICATE OF CORRECTION

PATENT NO. : 5,812,345
DATED : September 22, 1998
INVENTOR(S) : MacPherson et al.

It is certified that error appears in the above-identified patent and that said Letters Patent is hereby corrected as shown below:

Claim 12, Column 14, line 7, "between" should be deleted and --among-- substituted therefor.

Claim 12, Column 14, lines 20 to 24, the paragraph which begins "mean for moving..." and ends "...said actuator plane" should be deletd, and the following substituted therefor:

--means for moving said latch arm in a first direction from the first position and from the third position to the second position wherein movement in said first direction from said third position to said second position acts to release said engagement of said latching member with said latch and move said latch in said first direction out of said actuator plane, and wherein, following said release, said latch arm is moved in a second direction, opposite said first direction, to said first position wherein read/write commands are executed by said hard disk drive while said latch arm is in said first position.--

Signed and Sealed this

Sixteenth Day of March, 1999

Attest:

Q. TODD DICKINSON

Attesting Officer

Acting Commissioner of Patents and Trademarks